(12) United States Patent
Asaoku

(10) Patent No.: US 11,845,032 B2
(45) Date of Patent: Dec. 19, 2023

(54) EXHAUST GAS PURIFICATION FILTER

(71) Applicant: DENSO CORPORATION, Kariya (JP)

(72) Inventor: Kana Asaoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 18 days.

(21) Appl. No.: 17/573,295

(22) Filed: Jan. 11, 2022

(65) Prior Publication Data

US 2022/0126231 A1    Apr. 28, 2022

Related U.S. Application Data

(63) Continuation of application No. PCT/JP2020/026623, filed on Jul. 8, 2020.

(30) Foreign Application Priority Data

Jul. 12, 2019 (JP) .................................. 2019-130426

(51) Int. Cl.
  *B01D 46/24*        (2006.01)

(52) U.S. Cl.
  CPC ....... *B01D 46/2462* (2013.01); *B01D 46/247* (2013.01); *B01D 46/249* (2021.08); *B01D 46/2429* (2013.01); *B01D 46/2444* (2013.01); *B01D 46/2482* (2021.08); *B01D 46/2498* (2021.08); *B01D 46/24491* (2021.08)

(58) Field of Classification Search
  CPC .......... B01D 46/2462; B01D 46/24491; B01D 46/24; B01D 46/82; B01D 46/249; B01D 46/2498; B01D 46/2429; B01D 46/2444; B01D 46/247

USPC .......................................................... 55/523
See application file for complete search history.

(56) References Cited

U.S. PATENT DOCUMENTS

| | | | |
|---|---|---|---|
| 2004/0137194 A1 | 7/2004 | Fukao et al. | |
| 2005/0191461 A1 | 9/2005 | Kasai et al. | |
| 2006/0228519 A1 | 10/2006 | Kato | |
| 2009/0022942 A1 | 1/2009 | Hiramatsu et al. | |
| 2014/0370233 A1 | 12/2014 | Izumi et al. | |
| 2017/0216747 A1* | 8/2017 | Okazaki | C04B 38/0006 |
| 2018/0215672 A1* | 8/2018 | Kitaguchi | C04B 41/009 |
| 2018/0326340 A1 | 11/2018 | Kato et al. | |

(Continued)

FOREIGN PATENT DOCUMENTS

| | | |
|---|---|---|
| JP | 2005-270969 | 10/2005 |
| JP | 2006-025542 | 1/2006 |

(Continued)

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a cell assembly including cells and a partition wall, seal members, and a skin member. The partition wall has a porosity of 50% to 70%. The skin member has a thickness T of 0.3 mm to 1.0 mm. The partition wall includes crossing portions, each cell has at least one part of an outer periphery defined by a corresponding one of the crossing portions, the at least one part of the outer periphery is rounded to have a value of radius of curvature R being 0.02 mm to 0.6 mm A degree of distortion δ being a degree of change in the external dimensions of the filter in axial direction, is greater than 0 and is 1.5 mm or less. A value of a structural variable X, expressed by Equation 1 below, is 0.05 to 6, X=T×R/δ . . . Equation 1.

6 Claims, 13 Drawing Sheets

(56) References Cited

U.S. PATENT DOCUMENTS

2018/0326341 A1\* 11/2018 Kato ................ B01D 46/2484
2020/0386134 A1\* 12/2020 Miyairi ............... C04B 38/0016

FOREIGN PATENT DOCUMENTS

| JP | 2010-221159 | 10/2010 |
| JP | 2018-145928 | 9/2018 |
| WO | 2004/078674 | 9/2004 |
| WO | 2013/024745 | 2/2013 |

\* cited by examiner

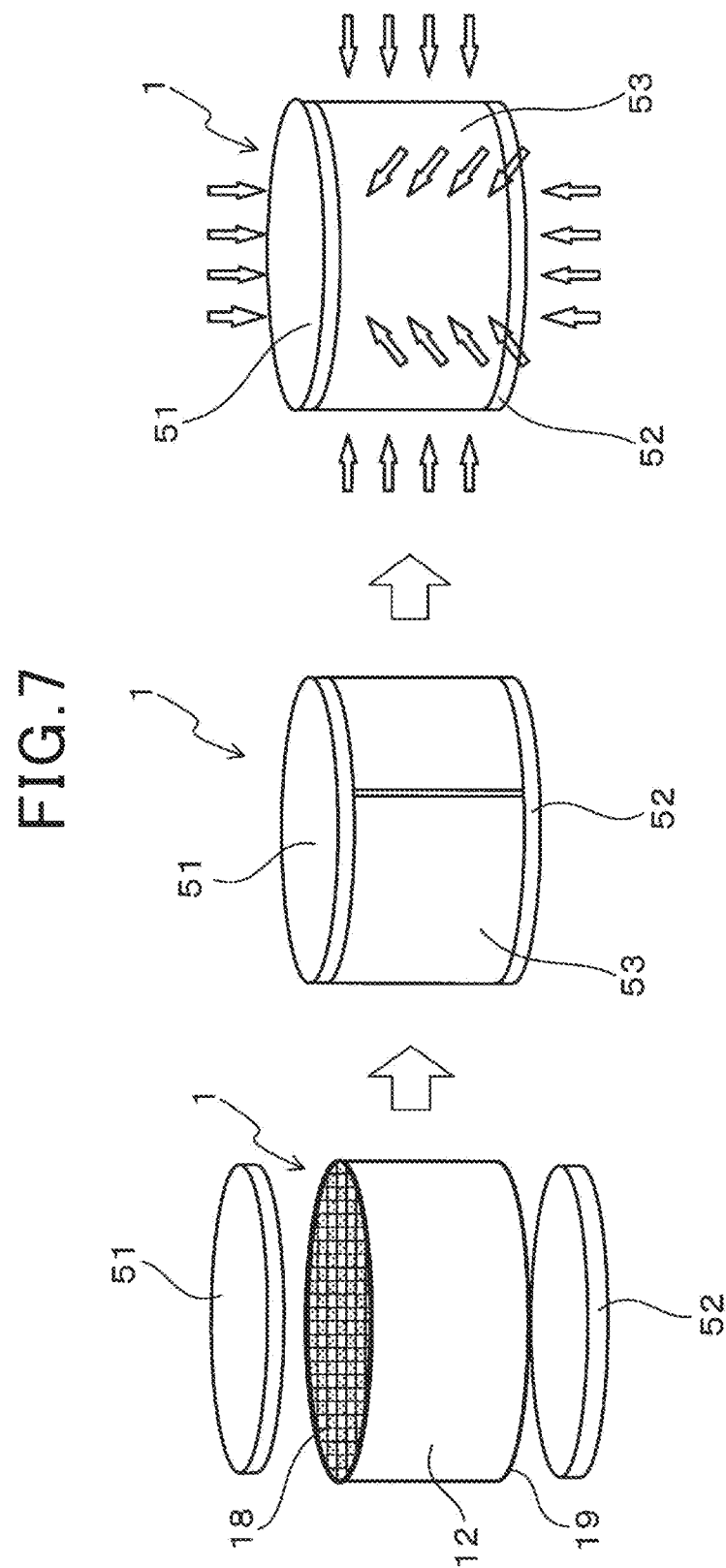

EXHAUST GAS PURIFICATION FILTER

CROSS-REFERENCE TO RELATED APPLICATION

The present application is a continuation application of International Application No. PCT/JP2020/026623, filed on Jul. 8, 2020, which claims priority to Japanese Patent Application No. 2019-130426, filed on Jul. 12, 2019. The contents of these applications are incorporated herein by reference in their entirety.

BACKGROUND

Technical Field

The present disclosure relates to an exhaust gas purification filter that is installed in the exhaust passage of a gasoline engine.

Background Technology

Exhaust gas from internal combustion engines such as gasoline engines and diesel engines contains particles referred to as particulate matter, abbreviated to "PM" in the following where appropriate. An exhaust gas purification filter is installed in the exhaust passage of an internal combustion engine to collect PM in the exhaust gas and purify the exhaust gas.

SUMMARY

In the present disclosure, provided is an exhaust gas purification filter as the following.

The exhaust gas purification filter includes a cell assembly, seal members, and a skin member. The cell assembly having an outer surface and including: a plurality of cells each disposed to extend in an axial direction of the filter, each of the cells having opposing first and second ends in the axial direction, and a partition wall configured to have a porous structure and define the plurality of cells partitioned from each other in a grid pattern. The skin member is configured to have a tubular shape and be mounted on the outer surface of the cell assembly. The partition wall has a porosity of 50% to 70%. The skin member has a thickness T of 0.3 mm to 1.0 mm. The partition wall includes a plurality of crossing portions, each of the cells has at least one part of an outer periphery defined by a corresponding one of the crossing portions, the at least one part of the outer periphery of each of the cells is rounded to have a value of radius of curvature R being 0.02 mm to 0.6 mm A degree of distortion $\delta$, which is a degree of change in the external dimensions of the exhaust gas purification filter in the axial direction, is greater than 0 and is 1.5 mm or less. A value of a structural variable X, expressed by Equation 1 below, is 0.05 to 6, $X=T\times R/\delta$ . . . Equation 1.

BRIEF DESCRIPTION OF THE DRAWINGS

The above objects and other objects, features and advantages of the present disclosure will be made clearer by the following detailed description, given referring to the appended drawings. In the drawings:

FIG. 7 is a schematic diagram illustrating an isostatic strength test in an experimental example.

DETAILED DESCRIPTION OF THE PREFERRED EMBODIMENTS

Figure 1:
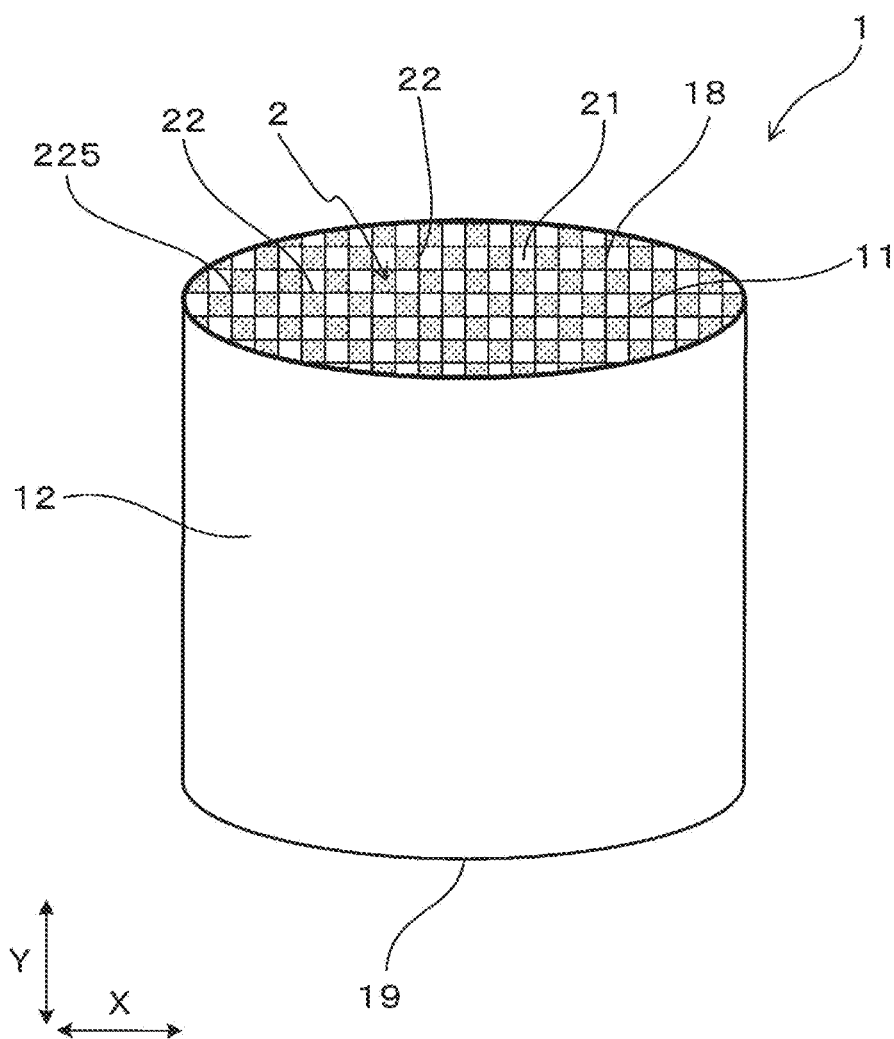
FIG. 1 is a schematic view of an exhaust gas purification filter according to a first embodiment.

An example of an exhaust gas purification filter is a diesel particulate filter disclosed in PTL 1, which collects PM emitted from a diesel engine. A technique is described in which the cross-sectional area and hydraulic diameter of predetermined cells among a large number of cells of a filter are made different from the cross-sectional area and hydraulic diameter of the remaining cells, and the corners of the cells are formed into an arc shape. According to that document, such a technique can prevent the end face of the filter on the inflow side from being blocked, and maintain high strength of the filter.

PTL 1: JP 2005-270969 A

If the structure of a filter, such as the partition wall, is strengthened in order to improve the strength, the cross-sectional area of the parts where partition wall crosses becomes large. Increasing the cross-sectional area of the partition wall causes deterioration of the flow of exhaust gas and increases the pressure loss. On the other hand, increasing the porosity in the partition wall is effective for reducing the pressure loss, however if the porosity is increased the strength of the filter decreases.

In general, by comparison with diesel engines, filters mounted on gasoline engines are located in a high temperature environment and the flow velocity of the exhaust gas is high, so that the pressure loss tends to increase. Therefore there is a possibility that during use, a filter mounted on a gasoline engine may move from its installation position, to the downstream side of the exhaust flow direction. Such misalignment can be effectively prevented by applying a high external force pressing on the filter to fix it at the mounting position, however if the dimensional accuracy of the filter is poor, local stress will be applied and cracking will occur in the filter.

The present disclosure is intended to provide an exhaust gas purification filter having low pressure loss and high strength.

One aspect of the present disclosure is an exhaust gas purification filter, having external dimensions, disposed in an exhaust passage of a gasoline engine. The exhaust gas purification filter includes: a cell assembly having an outer surface and including: a plurality of cells each disposed to extend in an axial direction of the filter, each of the cells having opposing first and second ends in the axial direction, and a partition wall configured to have a porous structure and define the plurality of cells partitioned from each other in a grid pattern; a plurality of seal members disposed alternately in the first and second ends of the respective cells, each of the seal members being configured to seal a corresponding one of the first end and the second end of a corresponding one of the cells of the cell assembly; and a skin member configured to have a tubular shape and be mounted on the outer surface of the cell assembly, wherein: the partition wall has a porosity of 50% to 70%, the skin member has a thickness T of 0.3 mm to 1.0 mm, the partition wall includes a plurality of crossing portions, each of the cells has at least one part of an outer periphery defined by a corresponding one of the crossing portions, the at least one part of the outer periphery of each of the cells is rounded to have a value of radius of curvature R being 0.02 mm to 0.6 mm, a degree of distortion δ, which is a degree of change in the external dimensions of the exhaust gas purification filter in the axial direction, is greater than 0 and is 1.5 mm or less, and a value of a structural variable X, expressed by Equation 1 below, is 0.05 to 6, $$X = T \times R / \delta \quad \text{Equation 1.}$$

The exhaust gas purification filter has the above configuration. In particular, the porosity, the thickness T of the skin member, the radius of curvature R of the at least one part of the outer periphery of each cell, and the degree of distortion δ, are within the above ranges, and the structural variable X represented by Equation 1 is within the above range. Thus, the exhaust gas purification filter has low pressure loss and high strength.

It should be noted that the reference numerals in parentheses in the claims indicate correspondences with the specific means described in the embodiments, described hereinafter, and do not limit the technical scope of the present invention.

First Embodiment

Figure 2:
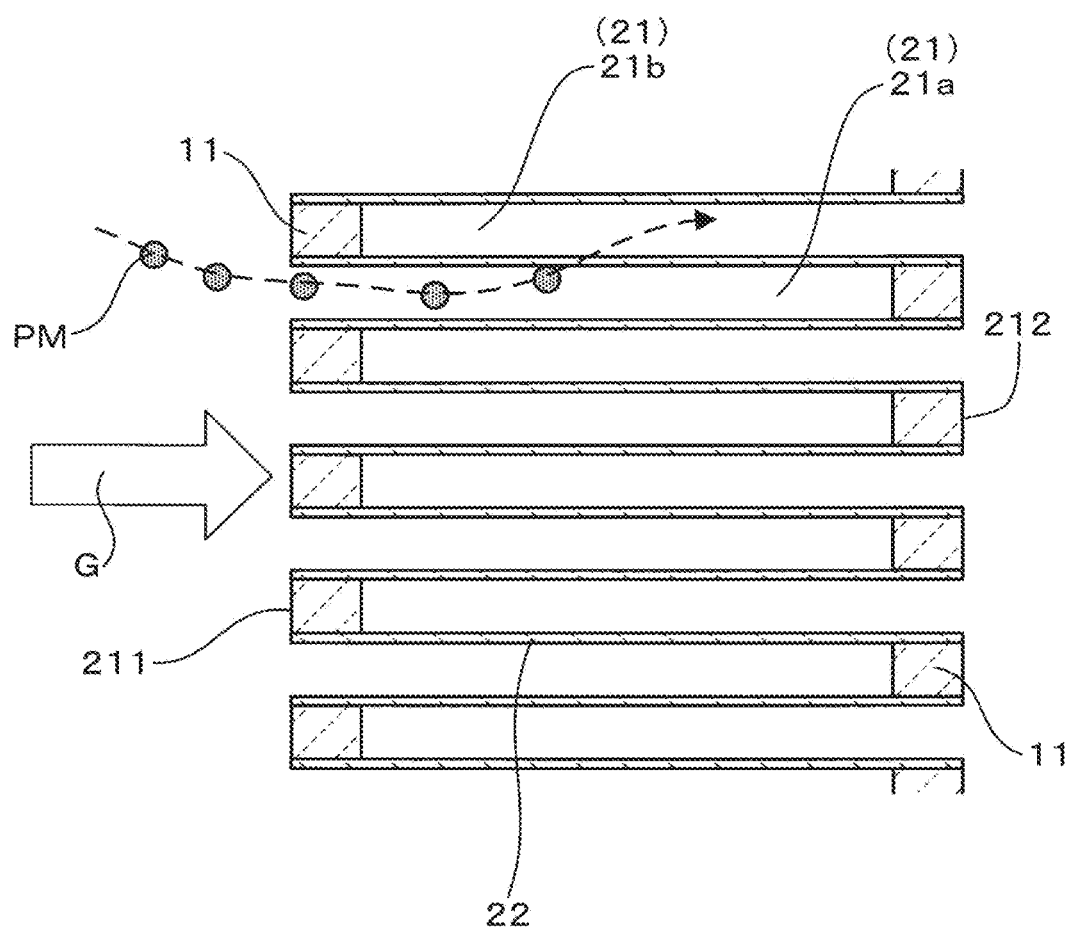
FIG. 2 is an enlarged cross-sectional view of the exhaust gas purification filter in the axial direction according to the first embodiment.
Figure 3:
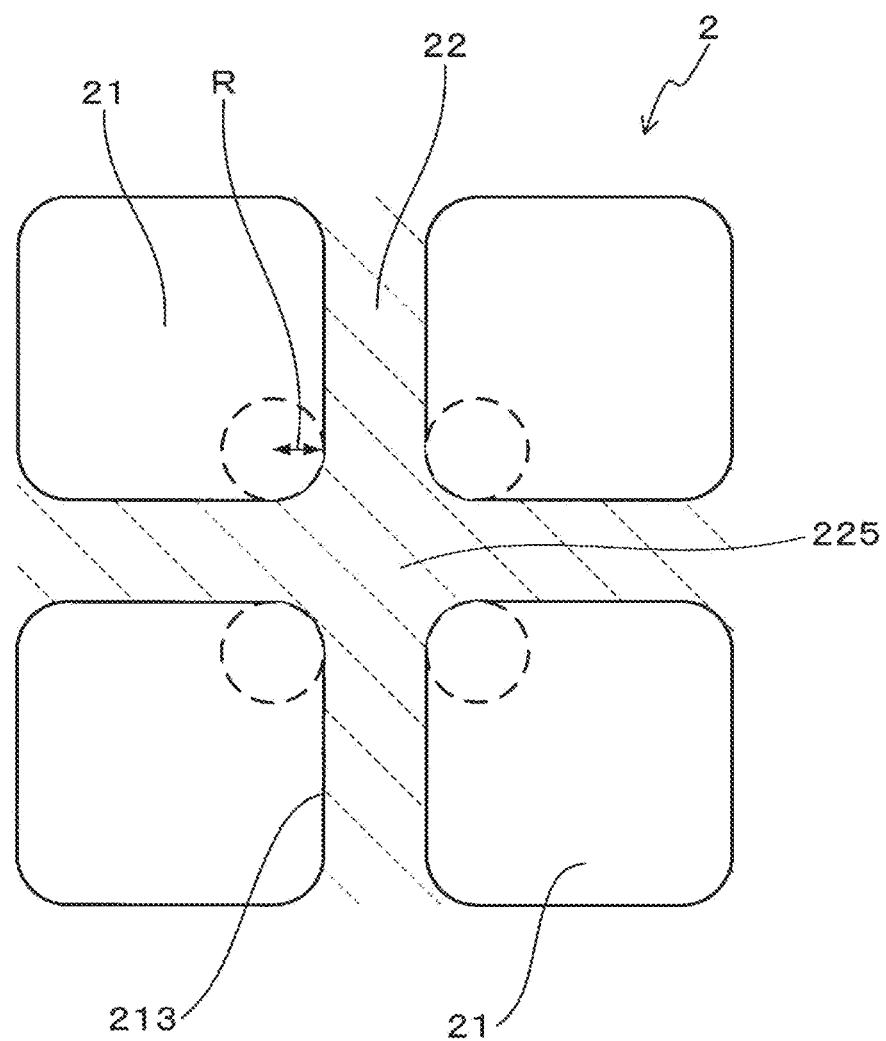
FIG. 3 is an enlarged cross-sectional view of a crossing position in a direction orthogonal to the axial direction of the exhaust gas purification filter according to the first embodiment.

An embodiment relating to an exhaust gas purification filter 1 will be described with reference to FIGS. 1 to 6. In the present specification, when a range of numeric values or physical property values is expressed by values that precede and succeed a dash "-", this signifies that the range is inclusive of these preceding and succeeding values. As shown in FIGS. 1 to 3, the exhaust gas purification filter 1 has a cell assembly 2, seal members 11, and a skin member 12. The cell assembly 2 and the skin member 12 are made of ceramic such as cordierite.

The cell assembly 2 is composed of a plurality of cells 21 and partition wall 22 having a porous structure. Each of the cells 21 extend in the filter axial direction Y. The filter axial direction Y and the extension direction of the cells 21 normally coincide. The filter axial direction is hereinafter referred to as the "axial direction", as appropriate. The partition wall 22 defines the cells 21 partitioned from each other and the cells 21 form in a grid pattern. The partition wall 22 is also known as the cell wall.

Figure 4:
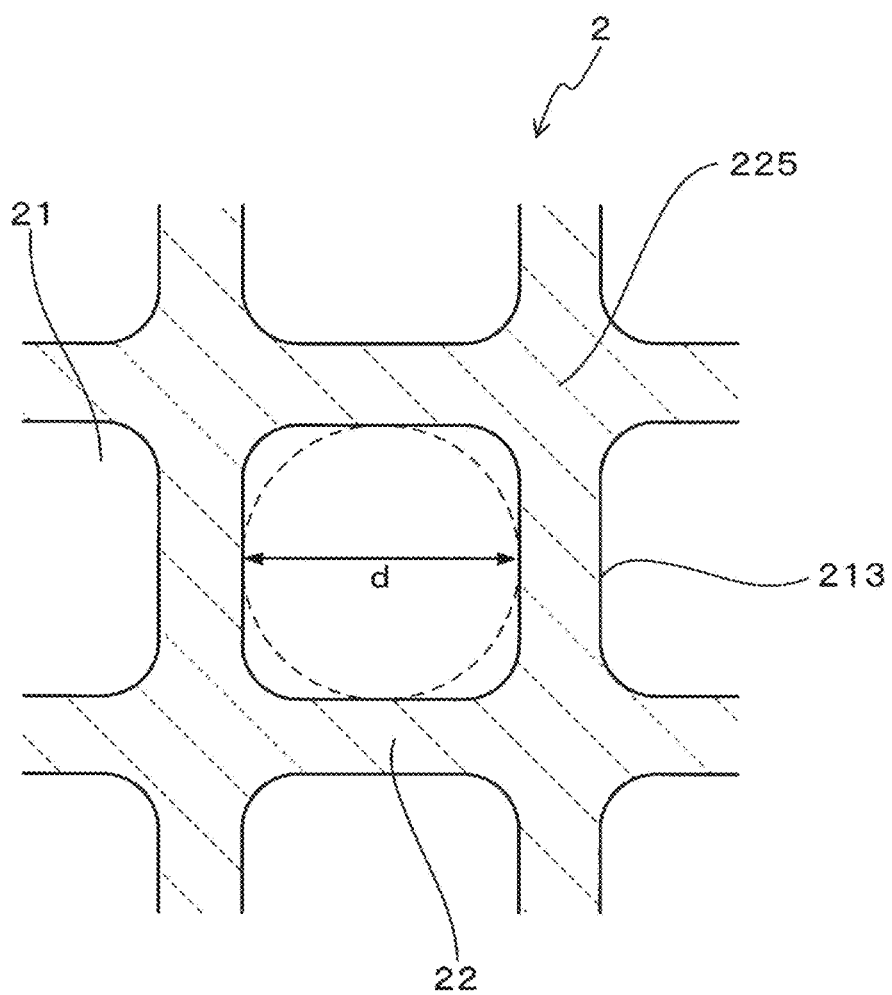
FIG. 4 is an enlarged cross-sectional view of a cell in a direction orthogonal to the axial direction of the exhaust gas purification filter according to the first embodiment.

As shown in FIGS. 1, 3 and 4, the cell shape in this example, as seen in a cross-sectional view of the filter in a direction orthogonal to the axial direction Y, is quadrangular, however the cell shape is not limited to this. The cell shape may equally be a polygonal shape such as a triangular shape or quadrangular shape or hexagonal shape, or may be a circular shape, etc. Furthermore the cell shape may be a combination of two or more different shapes. Even if the corners of a polygonal cell shape are rounded, it can be said that the cell shape is polygonal in appearance, so that the cell shape can be assumed to be polygonal.

The skin member 12 has a tubular shape, such as a cylindrical shape for example, is integrally formed on the outer periphery of the cell assembly 2. The axial direction of the skin member 12 generally coincides with the filter axial direction Y. The partition wall 22 divides the interior of the skin member 12 in a grid pattern to form a large number of cells 21. The exhaust gas purification filter 1 is a porous body, and a large number of pores are formed in the partition wall 22. The exhaust gas purification filter 1 can collect PM contained in the exhaust gas by accumulation on the surfaces in the partition wall 22 and in the pores. The PM consists of fine particles, known as particulate matter, particulates, etc.

The exhaust gas purification filter 1 is a columnar body, such as a cylindrical columnar body for example, and its dimensions can be changed as appropriate. When the exhaust gas purification filter 1 is cylindrical, the length L in the axial direction Y can have a value in the range 50-200 mm, and the diameter Φ can have a value in the range 100-165 mm. The exhaust gas purification filter 1 has an inflow end face 18 and an outflow end face 19 at respective ends, with respect to the filter axial direction Y. The inflow end face 18 is on the side where the exhaust gas flows in, and the outflow end face 19 is on the side from which the exhaust gas flows out. When in a condition of not being disposed in the flow of exhaust gas, such as in an exhaust pipe, the names "inflow end face 18" and "outflow end face 19" have significance relative to each other. That is, if one of the end faces is the inflow end face 18, the other is the outflow end face 19. For example, the inflow end face 18 can be referred to as the first end face with respect to the axial direction Y and the outflow end face 19 can be referred to as the second end face with respect to the axial direction Y.

The cell 21 have first cells 21a and second cells 21b. The first cells 21a open to the inflow end face 18, and are closed by seal members 11 at the outflow end face 19, for example, as shown in FIG. 2. The second cells 21b open to the outflow end face 19, and are closed by seal members 11 at the inflow end face 18, for example.

The seal members 11 alternately close respective ends 211 and 212 of the cells 21 in the filter axial direction Y. In other words, the seal members 11 close the ends 211 of the cells 21 at the inflow end face 18 and close the ends 212 of the cells 21 at the outflow end face 19. The seal members 11 can be formed for example of a ceramic such as cordierite, however may be made of other materials. In FIG. 2, plug-shaped seal members 11 are formed, however the shape of the seal members 11 is not particularly limited as long as end parts of the cells 21 can be sealed. Although the configuration is not shown, it is possible to form the seal members 11 by deforming parts of the partition wall 22 at the inflow end face 18 and the outflow end face 19, for example. In this case, since the seal members 11 are formed by parts of the partition wall 22, the partition wall 22 and the seal members 11 are integrally and continuously formed.

The first cells 21a and second cells 21b are arrayed alternately adjacent to each other, formed extending in the horizontal direction X, orthogonal to the filter axial direction Y and also in the vertical direction Z, orthogonal to both the filter axial direction Y and the horizontal direction X, for example. That is, when the inflow end surface 18 or the outflow end surface 19 of the exhaust gas purification filter 1 is viewed in the filter axial direction Y, the first cells 21a and the second cells 21b are arrayed in a check pattern, for example. The first cells 21a and the second cells 21b are separated by the partition wall 22.

The porosity in the partition wall 22 is 50 to 70%. If the porosity is less than 50%, the pressure loss becomes high, while if the porosity exceeds 70% the strength of the filter decreases. From considerations of improving the strength of the filter while reducing the pressure loss, the porosity is preferably made 55% to 67%, more preferably 57% to 67%, and even more preferably 60% to 66%. The porosity is measured based on the principles of the mercury intrusion method, and details of the measurement method are shown in the description of Experimental Example 1.

The partition wall 22 includes a plurality of crossing portions 225, each of the cells 21 has at least one part of the outer periphery 213 defined by a corresponding one of the crossing portions, the at least one part of the outer periphery 213 of each of the cells is rounded. That is, as shown in FIG. 3, as viewed in cross-section taken in a plane orthogonal to the filter axial direction Y, the parts of the outer periphery 213 of the cells 21 are arc-shaped at the crossing portions 225 of the partition wall 22. The crossing portions 225 of the partition wall 22 in the above cross-section can be said to be a corner part of the cells 21. That is, stating that each of the cells 21 has at least one part of the outer periphery 213 defined by a corresponding one of the crossing portions and the at least one part of the outer periphery of each of the cells is rounded is effectively the same as stating that the corners of the cells 21 are arc-shaped. By making the crossing positions 225 arc-shaped, the cross-sectional area of the partition wall 22 at the crossing positions 225 can be increased by comparison with the case where the crossing positions 225 have a right-angled shape. As a result, the partition wall 22 are reinforced at the crossing positions 225, and the filter strength is improved. In particular, the strength against stress acting in a direction orthogonal to the filter axial direction Y is improved. The crossing positions 225 are positions where the partition wall 22 formed in the grid pattern intersect. If the exhaust gas purification filter 1 is cylindrical in form, the direction orthogonal to the filter axial direction Y is the radial direction.

The degree of distortion δ of the exhaust gas purification filter 1 will be explained in the following. The degree of distortion is the degree of change in the external dimensions of the exhaust gas purification filter 1 with respect to the filter axial direction Y. More specifically, the degree of distortion is the difference between the maximum and minimum values of a dimension (for example the radius) in a direction orthogonal to the axial direction Y at three positions, consisting of positions located 5 mm to the interior from respective ends of the filter, with respect to the axial direction Y, and a position at the center of the filter with respect to the axial direction Y.

Figure 5A:
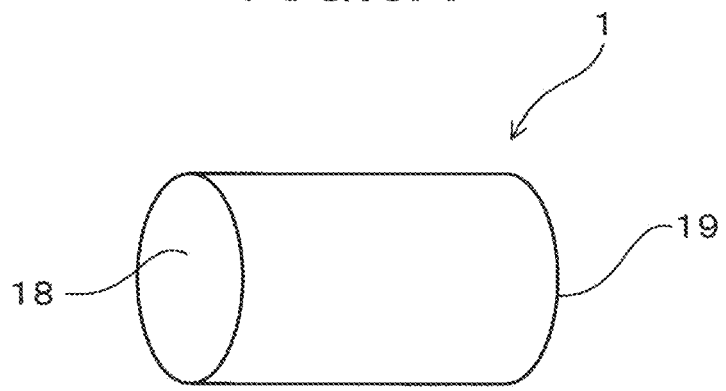
FIG. 5A is an external schematic view of an exhaust gas purification filter having no axial distortion in the axial direction according to the first embodiment.
Figure 5B:
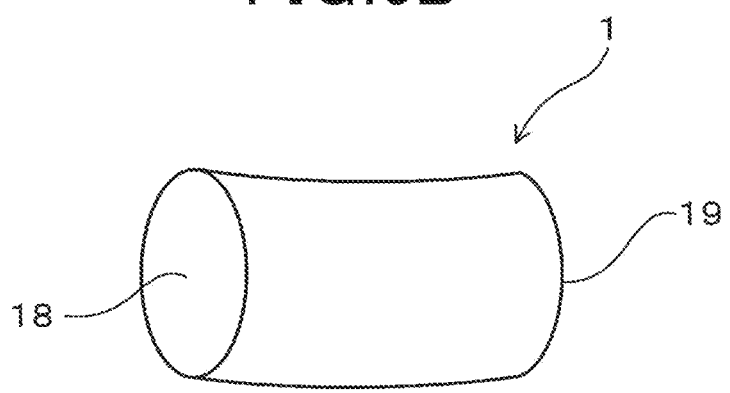
FIG. 5B is an external schematic view of an exhaust gas purification filter having a high degree of axial distortion according to the first embodiment.
Figure 5C:
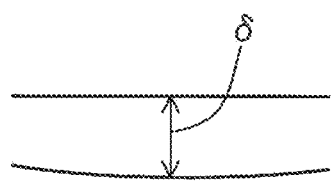
FIG. 5C is an explanatory view showing a dimensional difference in a direction orthogonal to the axial direction of the exhaust gas purification filter according to the first embodiment.

FIG. 5A shows an example of the external shape of an exhaust gas purification filter 1 having a degree of distortion of 0, and FIG. 5B shows an example of the external shape of an exhaust gas purification filter 1 having a high degree of distortion. In FIGS. 5 (a) and 5 (b), the partition wall 22 and the cells are not shown, for convenience of presenting the diagrams. The exhaust gas purification filter 1 shown in FIG. 5B is axially distorted relative to the exhaust gas purification filter 1 shown in FIG. 5A. In this case, as shown in FIG. 5C, differences arise between the external dimensions as measured in a direction orthogonal to the axial direction Y of the filter. This difference is the degree of distortion δ. When the exhaust gas purification filter 1 has for example, a columnar shape, the external dimension is, for example, a radius. In FIG. 5C, the direction in the diagram orthogonal to the paper surface is the filter axial direction Y. The method of measuring the degree of distortion will be demonstrated by an experimental example.

In the exhaust gas purification filter 1, the value of the structural variable X is in the range 0.05-6. As shown in Equation 1, the structural variable X is expressed by the relationship between the thickness T mm of the skin member 12, the radius of curvature R mm of each of the parts of the outer periphery 213 of each of the cells 21 defined by a corresponding one of the crossing portions 225, and the degree of distortion δ mm. However, the possible ranges of T, R, and δ are 0.3≤T≤1.0, 0.02≤R≤0.6, and 0<δ≤1.5.

$$X = T \times R / \delta \qquad (1)$$

If T<0.3, R<0.02, or δ>1.5, the filter strength becomes insufficient. In particular, the strength with respect to stress acting in a direction orthogonal to the filter axial direction Y becomes insufficient. Thus for example, the exhaust gas purification filter 1 may become cracked during an assembly operation known as canning, in which a ceramic mat is wound around the exhaust gas purification filter 1 and the filter is inserted into the filter case. The reasons for this are as follows. If T<0.3, the thickness of the skin member 12 becomes excessively small. If R<0.02, the degree of reinforcement at the crossing positions 225 becomes insufficient. If δ>1.5, then due to the high degree of distortion, local stress is liable to be applied to the filter, causing the stress to become large.

If T>1.0 or R>0.6 m, the pressure loss becomes large. The reasons for this are as follows. If T>1.0, the thickness of the skin member 12 becomes excessively large. If R>0.6, the cross-sectional area of the partition wall 22 at the crossing positions 225 becomes excessively large. If δ=0, the filter would become an ideal body, without distortion. However it is not possible for δ to be made substantially zero, due to the property of a ceramic of shrinking during firing.

The structural variable X will next be explained. As shown by equation 1, the structural variable X is a function of the thickness T mm, the radius of curvature R mm, and the degree of distortion δ mm. In equation 1, 0.3 ☐T ☐1.0, 0.02 ☐R ☐0.6, and 0<δ ☐1.5. By setting the structural variable X within the range 0.05~6, the filter strength can be improved while maintaining a low degree of pressure loss. In particular, since the strength against stress acting in a direction orthogonal to the filter axial direction Y is improved, cracking at the time of canning can be prevented. From considerations of compatibility with a low degree of pressure loss and high strength, the structural variable X is preferably in the range 0.1-6, more preferably 1-6, and even more preferably 1-3. The relationship between the structural variable X, the pressure loss, and the filter strength is specifically demonstrated by Experimental Example 1.

It is preferable that the cross-sectional shape of the cell 21, in a plane orthogonal to the filter axial direction Y, is quadrangular, and that the hydraulic diameter d of the cell 21 and the radius of curvature R satisfy the relationship of Equation 2. In this case, compatibility with a low amount of pressure loss and high strength can be achieved. As indicated in the cross-sectional shape of a cell 21 shown in FIG. 4, the gas generally flows within a circle having a diameter known as the hydraulic diameter, even if the opening cross-section through which the gas flows is square in shape. Thus, even if the corner portions of the cell 21 are made arc-shaped, then theoretically the pressure loss will not be increased, if these portions are outside the circle of the hydraulic diameter. However due to the fact that the partition wall 22 of the exhaust gas purification filter 1 are porous and gas passes through the partition wall, even in a structure in which the radius of curvature R is set outside the circle of the hydraulic diameter, the boundary point where the pressure loss increases exists within the numerical range of the radius of curvature R outside the hydraulic diameter. Details of Equation 2 will be shown by Experimental Example 2.

$$R \leq 0.5 \times d/2 \quad \text{Equation 2}$$

It is preferable that the material strength $S_A$ of the cell assembly 2 and the material strength $S_B$ of the skin member 12 satisfy the relationship of equation 3. In this case, the flow of the exhaust gas is made even, an increase in pressure loss is further suppressed, and the filter strength is further improved. Details of the relationship of Equation 3 are shown in Experimental Example 3.

$$S_A < S_B \quad \text{Equation 3}$$

It is preferable that the porosity $P_A$ of the cell assembly 2 and the porosity $P_B$ of the skin member 12 satisfy the relationship of the following Equation 4. In this case also, the flow of exhaust gas is smoothed and an increase in pressure loss is further suppressed, and the filter strength is further improved. The porosity $P_A$ of the cell assembly 2 has the same meaning as the porosity of the partition wall 22. Details of the relationship of Equation 4 are shown in Experimental Example 3.

$$P_A > P_B \quad \text{Equation 4}$$

Figure 6:
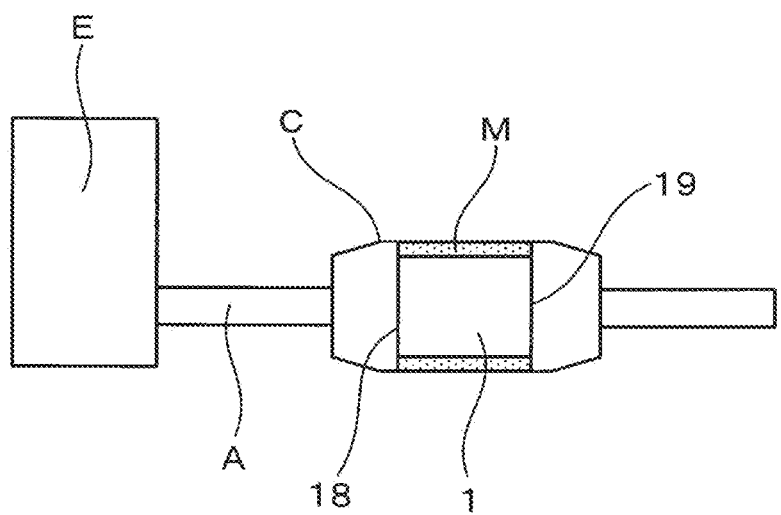
FIG. 6 is a schematic view of an exhaust gas purification filter disposed in an exhaust passage according to the first embodiment.

As shown in FIG. 6, the exhaust gas purification filter 1 is disposed in the exhaust passage A of a gasoline engine E. Specifically, for example, the exhaust passage A is connected to the filter case C that houses the exhaust gas purification filter 1 inside. The exhaust gas purification filter 1 is housed in the filter case C with the ceramic mat M wound around the skin member 12. In order to prevent misalignment during use, an external pressure is applied to the exhaust gas purification filter 1 in the filter case C in a direction orthogonal to the axial direction Y.

If the porosity, thickness T of the skin member 12, the radius of curvature R of each of the parts of the outer periphery 213 of each of the cells 21 defined by a corresponding one of the crossing portions 225, and the degree of distortion δ are within the above ranges, and the structural variable X is within the above range, then the exhaust gas purification filter 1 will have a low amount of pressure loss and high filter strength. That is, the exhaust gas purification filter 1 can be prevented from cracking, while maintaining the low amount of pressure loss, even if an external pressure is applied in a direction orthogonal to the axial direction Y.

The exhaust gas purification filter 1 is manufactured as follows, for example. First, a clay containing raw material for forming cordierite is prepared. The clay is prepared by adjusting amounts of silica, talc, aluminum hydroxide, etc. for constituting cordierite, and further adding a binder such as methyl cellulose, a pore-forming material such as graphite, a lubricating oil, water, etc., as appropriate and mixing them. It is equally possible to blend alumina and kaolin for constituting the cordierite. Porous silica can be used as the silica. In the cordierite forming raw material, silica and talc can be used as the pore forming raw material. The pore-forming raw material is a material that forms pores. The pore-forming raw material produces a liquid phase component at the time of firing, whereby the pores are formed. On the other hand, aluminum hydroxide, alumina, and kaolin can be used as the aggregate raw material in the cordierite forming raw material. The aggregate raw material is a material that forms the parts of the ceramic part other than the pores.

Next, the clay is molded, dried, and fired. As a result, a honeycomb structure having an integrally formed skin member 12 and a cell assembly 2 is formed. The honeycomb structure consists of the skin member 12, partition wall 22, and cells 21. Seal members 11 are formed after firing of the honeycomb structure, or before firing. Specifically, the seal members 11 are formed as follows, for example. The end faces of the respective cells 21 of the honeycomb structure after firing or the molded body of the honeycomb structure before firing, are alternately sealed by a seal forming slurry, and then by firing to thereby form the seal members 11.

The thickness T of the skin member 12, the radius of curvature R of each of the parts of the outer periphery 213 of each of the cells 21 defined by a corresponding one of the crossing portions 225, and the hydraulic diameter of each cell 21 can be adjusted, for example, by the mold design at the time of molding. The degree of distortion can be adjusted by changing, for example, molding conditions such as the extrusion speed, drying conditions of the molded body, the firing conditions, etc. The porosity and material strength can be adjusted by the raw material composition, change in the design of the mold used at the time of molding, molding conditions such as extrusion molding pressure, etc.

EXPERIMENTAL EXAMPLE

First, various measurement methods used in the experimental examples will be described. It should be noted that of the reference indications used in the experimental examples and thereafter, those which are the same as are used in the above embodiment represent the same constituent elements, etc., as in the above embodiment, unless otherwise specified.

Isostatic Strength Test

The isostatic strength test is measured based on the automobile standard JASO M505-87 issued by the Society of Automotive Engineers of Japan. As shown in FIG. 7, aluminum plates 51 and 52 having a thickness of 20 mm are brought into contact with the both end faces 18 and 19 of the exhaust gas purification filter 1 respectively in the axial direction Y, to seal both end faces, and rubber 53 having a thickness of 2 mm was brought into close contact with the surface of the skin member 12. The exhaust gas purification filter 1 was placed in a pressure vessel, water was introduced into the pressure vessel, and hydrostatic pressure was applied from the surface of the skin member 12. The pressure at which the exhaust gas purification filter 1 is damaged is defined as the isostatic strength.

Pressure Loss

The exhaust gas purification filter 1 was installed in the exhaust pipe of a 2.0 L gasoline direct injection engine, and the air intake quantity (Ga) was set to 100 g/s (steady state). Exhaust gas containing PM was then caused to flow through the exhaust gas purification filter 1. At this time, the pressure before and after passing through the exhaust gas purification filter 1 was measured, and the difference thereof was measured as the pressure loss.

Material Strength

Figure 8A:
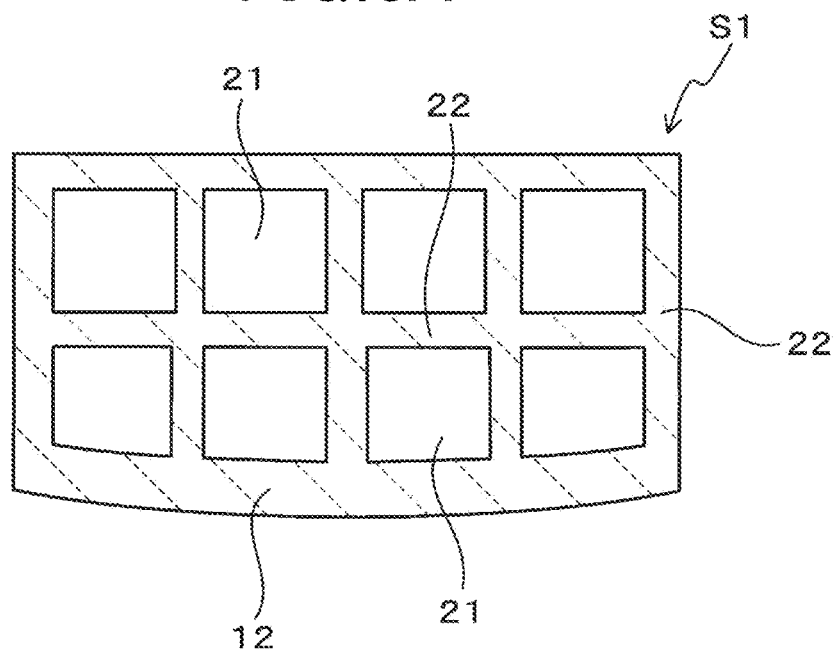
FIG. 8A is a cross-sectional schematic diagram of a measurement sample used for measuring the material strength of a skin member of the exhaust gas purification filter in an experimental example.
Figure 8B:
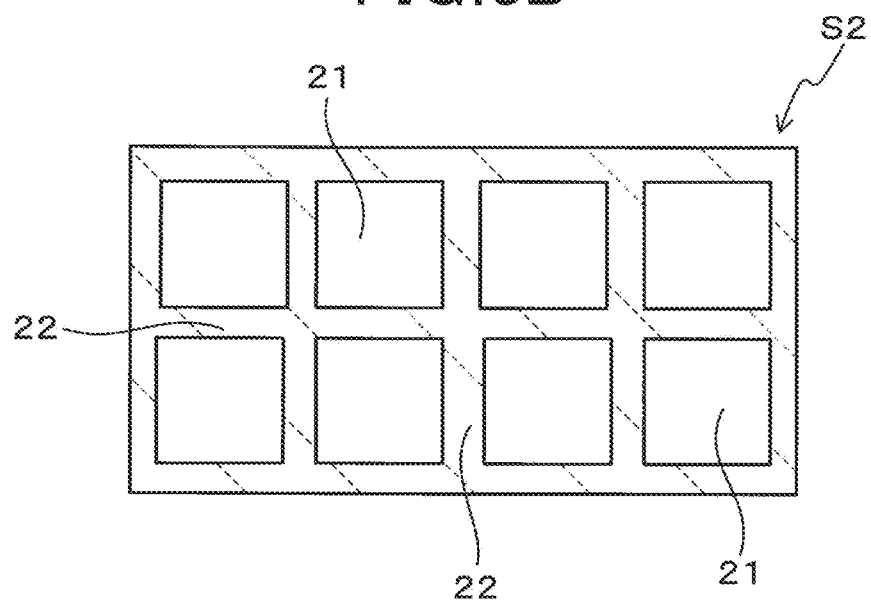
FIG. 8B is a cross-sectional schematic diagram of a measurement sample used for measuring the material strength of a cell assembly of the exhaust gas purification filter in an experimental example.

First, measurement samples S1 and S2 shown in FIGS. 8(a) and 8(b) respectively, were collected from the exhaust gas purification filter 1. Specifically, five measurement samples S2 were collected from a range that was 30 mm in the radial direction from the center of the exhaust gas purification filter 1 in a direction orthogonal to the filter axial direction Y (specifically, a radial direction), and five measurement samples S1 were collected from a range that was 30 mm in the radial direction from the outermost circumference in a direction orthogonal to the filter axial direction Y. As shown in FIG. 8A the measurement samples S1, collected from the range 30 mm from the outermost circumference in the radial direction, include parts of the skin member 12. The measurement samples S1 and S2 each include four of the cells 21 in the width direction and two of the cells 21 in the thickness direction. The length of the respective measurement samples S1 and S2 in the filter axial direction Y is 50 mm, and the measurement samples are block bodies.

Figure 9:
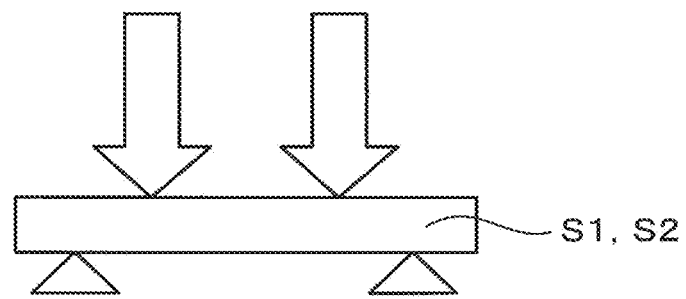
FIG. 9 is a schematic view showing a four-point bending test performed in an experimental example.

As shown in FIG. 9, the measurement samples S1 and S2 were subjected to a four-point bending test in accordance with JIS R1601: 2008 "Test method for room temperature bending strength of fine ceramics", and the material strength of the filter was taken as the value obtained by dividing the bending moment (units: N·m) at which cracking occurred in the measurement sample, by a section modulus, the section modulus taking into consideration the cross-sectional area of the filter. The material strength $S_A$ of the cell assembly 2 is the average value of the material strengths of the five measurement samples S2. The material strength $S_B$ of the skin member 12 is the average value of the material strengths of the five measurement samples S1.

Material strength is expressed by the following equation.

Material strength (MPa)=bending moment (N·mm)/section modulus (mm³)

The bending moment is expressed by the following equation.

Bending moment (N·mm)=load (N)×the distance (mm) between fulcrums of four-point bending test/4

Figure 10:
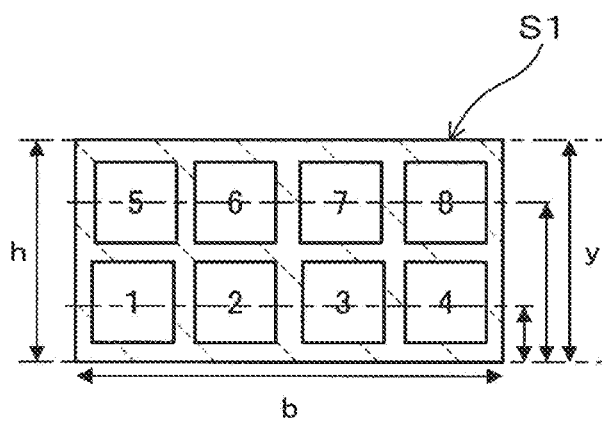
FIG. 10 is an explanatory view showing the relationship between the material strength of a measurement sample and the variables of the section modulus in the experimental example.

The section modulus is expressed by the following Equation 5. As shown in FIG. 10, in Equation 5: a is the cross-sectional area (mm²) of the measurement sample in a plane orthogonal to the filter axial direction Y; y is the distance (mm) from each reference axis to the member surface; b is the width of the measurement sample (mm); h is the height of the measurement sample (mm); i is the moment of inertia of area (mm⁴) of each cell part. FIG. 10 applies to the measurement sample S1. The same applies also to the measurement sample S2.

$$\text{Cross-section coefficient (mm}^3\text{)} = \frac{\text{moment of inertia of area (mm4)}}{\text{distance from reference axis to member surface (mm)}} = \frac{\sum(ay^2 + i) - \sum aY^2}{Y} =$$

$$\frac{\sum(ay^2 + i) - \sum a(\sum ay/(a - \sum a))^2}{\sum ay/(a - \sum a)} -$$

$$\sum a \times \sum ay/(a - \sum a) =$$

$$\frac{\sum(ay^2 + bh^3/12)}{\sum ay/(a - \sum a)} - \sum a \times \sum ay/(a - \sum a)$$

Equation 5

Figure 11:
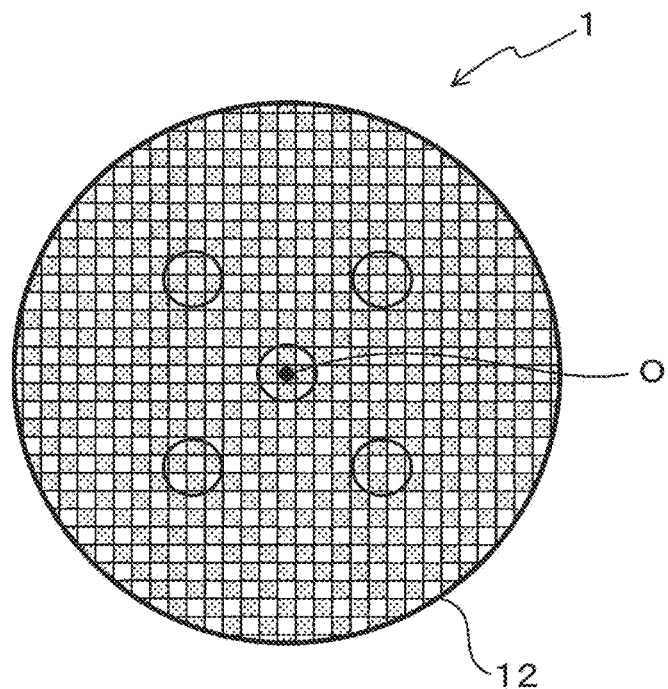
FIG. 11 is an explanatory view showing positions at which the radius of curvature R was measured in an experimental example.

Radius of Curvature R of Each of the Parts of the Outer Periphery of Each of the Cells Defined by a Corresponding One of the Crossing Portions of the Partition Wall As shown in FIG. 3, the radius of curvature is the radius R of the circle of maximum size adjacent to the rounded part of a cell 21 at a crossing portions 225 of the partition wall 22. As shown in FIG. 11, the measurement points are located at a center part O which is central in a direction orthogonal to the filter axial direction Y, and at four positions which are respectively located in 45 degree direction from the center part O and whose distances from the center part O are respectively half the distance between the center part O and the skin member 12. That is, there are a total of 5 measurement positions. At each measurement position, the four radii of curvature formed at one crossing portions 225 were measured. That is, a total of 20 radii of curvature were measured. The average value of these radii of curvature is taken as the radius of curvature of each of the parts of the outer periphery 213 of each of the cells 21 defined by a corresponding one of the crossing portions 225.

Hydraulic Diameter d

The term "hydraulic diameter" refers to the inner diameter of the interior of a pipe through which a fluid flows. If the flow path is not circular in cross section, such as for the cells of the exhaust gas purification filter, which are square in cross section, the hydraulic diameter d is calculated from the cross-sectional area A and cross-sectional length L of the cell, using the following Equation 6. When the cross-sectional shape of the cell is quadrangular, the cross-sectional length L is taken to be the sum of the lengths of the sides of the quadrangle. In measuring the lengths of the respective sides, rounded vertices in the cross-sectional shape of the cell are regarded as non-rounded right-angled vertices. The measurement positions are in accordance with the above-mentioned radius of curvature R.

$D=4A/L$     Equation 6

Skin Thickness T

Figure 12:
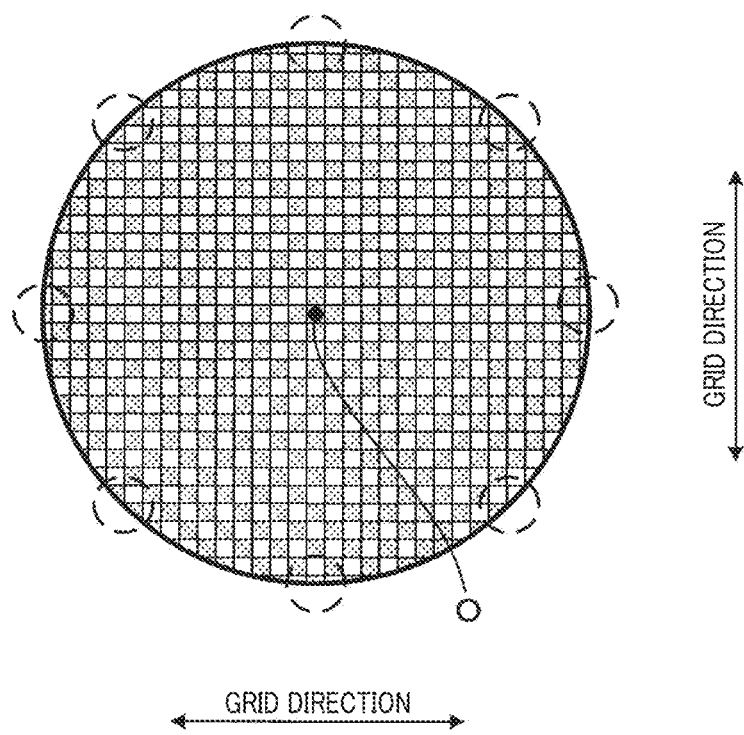
FIG. 12 is an explanatory view showing positions at which the thickness of the skin member was measured in the experimental example.

The thickness of the skin member 12 on an end face (inflow end face 18 or outflow end face 19) in the axial direction Y of the filter was measured at eight positions. The thickness T of the skin member 12 is the average of the respective thickness values at the eight positions. A tool makers microscope was used for the measurement. The measurement positions include the four intersections between the skin member 12 and four lines extending from the center part O in directions that are orthogonal to the filter axial direction Y and being respectively along the grid directions, and the four intersections between the skin member 12 and four lines extending from the center part O and being respectively along the directions inclined at 45° with respect to the grid directions. That is, there are a total of eight measurement positions, shown within broken line circles in FIG. 12.

Degree of Distortion

Figure 13:
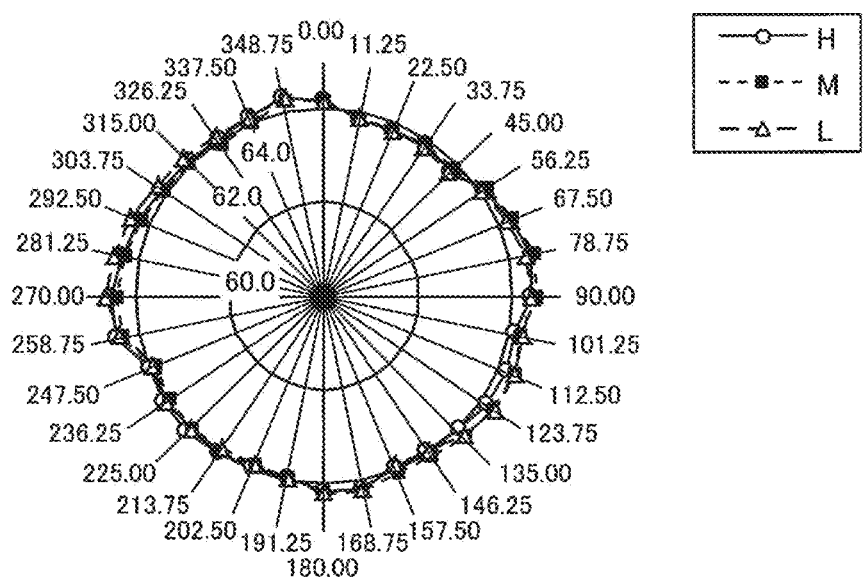
FIG. 13 shows the radius H of the exhaust gas purification filter at a position 5 mm from the inflow end face with respect to the filter axial direction, the radius M of the exhaust gas purification filter at the center of the filter, and the radius L of the exhaust gas purification filter at a position 5 mm from the outflow end face with respect to the filter axial direction.

Using a laser measuring device, the radial dimension of the outer circumference of the exhaust gas purification filter 1 was measured at a first position which is 5 mm inward from the inflow end face 18 with respect to the filter axial direction Y, a second position which is 5 mm inward from the outflow end face 19 with respect to the filter axial direction Y, and a third position which is the center of the filter with respect to the filter axial direction Y. Radial dimension views of the outer circumference of the exhaust gas purification filter 1 can thereby be obtained, as illustrated in FIG. 13. The difference between the maximum radius and the minimum radius in the radial dimensional views obtained at the first position, the second position and the third position is defined as the degree of distortion. In FIG. 13, the radial dimension at the first position is represented by H, the radial dimension at the third position is represented by M, and the radial dimension at the second position is represented by L. The radial dimension diagram shown in FIG. 13 approaches a perfect circle as the distortion becomes smaller, and becomes a perfect circle when there is no distortion.

Porosity P a of Cell Assembly, Porosity P B of Skin Member

The porosity in the partition wall 22 of the exhaust gas purification filter 1 was measured by a mercury porosimeter using the principles of the mercury intrusion method. The Autopore IV9500 manufactured by Shimadzu Corporation was used as the mercury porosimeter. The measurement conditions were as follows.

First, measurement samples were taken from the cell assembly 2 and the skin member 12 of the exhaust gas purification filter 1. The measurement sample of the cell assembly 2 is substantially a cube having a length of 1 cm in the filter axial direction Y, a length of 1 cm in the thickness direction of the partition wall 22, and a length of 1 cm in a direction orthogonal to the filter axial direction Y and the wall thickness direction. The measurement sample of the skin member 12 is a substantially cubic body, having a length of 1 cm in the filter axial direction Y, a length of 1 cm in the thickness direction of the partition wall 22 including the skin member and from the skin member toward the center of the filter, and a length of 1 cm in a direction orthogonal to the filter axial direction Y and the wall thickness direction. Each measurement sample was enclosed in the measurement cell of the mercury porosimeter, and the interior of the measurement cell was depressurized. Mercury was then introduced into the measurement cell and pressurized, and the pore diameter was measured based on the pressure at the time of pressurization and the volume of mercury that become introduced into the pores of the measurement sample.

The measurement was performed in a pressure range of 0.5 to 20000 psia. It should be noted that 0.5 psia corresponds to $0.35 \times 10^{-3}$ kg/mm$^2$, and 20000 psia corresponds to 14 kg/mm$^2$. The range of values of the pore diameter corresponding to this pressure range is 0.01 to 420 μm.

A contact angle of 140° and a surface tension of 480 dyn/cm were used as constants when calculating the pore diameter from the pressure. The porosity was calculated from the following relational expression. The true specific density of cordierite is 2.52.

Porosity (%)=total pore volume/(total pore volume+ 1/true specific density of cordierite)×100

Experimental Example 1

In this example, a plurality of exhaust gas purification filters 1 were manufactured by changing the manufacturing conditions. Each of the exhaust gas purification filters 1 has a length L in the axial direction Y of 120 mm, a diameter Φ of 118 mm, a quadrangular cross-sectional shape of the cells 21, a partition wall thickness of 0.2 mm, a cell pitch of 1.47 mm, and a porosity of 64%. The thickness T of the skin member 12, the radius of curvature R of each of the parts of the outer periphery 213 of each of the cells 21 defined by a corresponding one of the crossing portions 225, the degree of distortion δ, the pressure loss, and the isostatic strength were respectively measured for each exhaust gas purification filter 1. Furthermore the structural variable X was calculated based on Equation 1. The results are shown in Tables 1 to 8 and in FIGS. 14 and 15.

TABLE 1

(Variations in Thickness of Skin member)

| Thickness T of skin member mm | Degree of distortion δ mm | Radius of curvature R mm | X — | Pressure loss kPa |
|---|---|---|---|---|
| 0.3 | 0.1 | 0.60 | 1.80 | 3.30 |
| 0.4 | 0.1 | 0.60 | 2.40 | 3.30 |
| 0.5 | 0.1 | 0.60 | 3.00 | 3.30 |
| 0.6 | 0.1 | 0.60 | 3.60 | 3.30 |
| 0.7 | 0.1 | 0.60 | 4.20 | 3.30 |
| 0.8 | 0.1 | 0.60 | 4.80 | 3.30 |
| 0.9 | 0.1 | 0.60 | 5.40 | 3.30 |
| 1 | 0.1 | 0.60 | 6.00 | 3.30 |
| 1.5 | 0.1 | 0.60 | 9.00 | 3.30 |

TABLE 2

(Variations in Degree of Distortion)

| Thickness T of skin member mm | Degree of distortion δ mm | Radius of curvature R mm | X — | Pressure loss kPa |
|---|---|---|---|---|
| 1 | 1.5 | 0.60 | 0.40 | 3.30 |
| 1 | 1.4 | 0.60 | 0.43 | 3.30 |
| 1 | 1.3 | 0.60 | 0.46 | 3.30 |
| 1 | 1.2 | 0.60 | 0.50 | 3.30 |
| 1 | 1.1 | 0.60 | 0.55 | 3.30 |
| 1 | 1 | 0.60 | 0.60 | 3.30 |
| 1 | 0.9 | 0.60 | 0.67 | 3.30 |
| 1 | 0.8 | 0.60 | 0.75 | 3.30 |
| 1 | 0.7 | 0.60 | 0.86 | 3.30 |

TABLE 2-continued (Variations in Degree of Distortion)

| Thickness T of skin member mm | Degree of distortion δ mm | Radius of curvature R mm | X — | Pressure loss kPa |
|---|---|---|---|---|
| 1 | 0.6 | 0.60 | 1.00 | 3.30 |
| 1 | 0.5 | 0.60 | 1.20 | 3.30 |
| 1 | 0.4 | 0.60 | 1.50 | 3.30 |
| 1 | 0.3 | 0.60 | 2.00 | 3.30 |
| 1 | 0.2 | 0.60 | 3.00 | 3.30 |
| 1 | 0.1 | 0.60 | 6.00 | 3.30 |

TABLE 3

(Variations in Radius of Curvature R)

| Thickness T of skin member mm | Degree of distortion δ mm | Radius of curvature R mm | X — | Pressure loss kPa |
|---|---|---|---|---|
| 1 | 0.1 | 0.02 | 0.20 | 3.30 |
| 1 | 0.1 | 0.10 | 1.00 | 3.30 |
| 1 | 0.1 | 0.20 | 2.00 | 3.34 |
| 1 | 0.1 | 0.30 | 3.00 | 3.38 |
| 1 | 0.1 | 0.40 | 4.00 | 3.42 |
| 1 | 0.1 | 0.50 | 5.00 | 3.46 |
| 1 | 0.1 | 0.60 | 6.00 | 3.50 |
| 1 | 0.1 | 0.70 | 7.00 | 4.00 |
| 1 | 0.1 | 1.00 | 10.00 | 6.60 |

TABLE 4

(Variations of Combinations)

| Thickness T of skin member mm | Degree of distortion δ mm | Radius of curvature R mm | X — | Pressure loss kPa |
|---|---|---|---|---|
| 0.6 | 0.25 | 0.40 | 1.00 | 3.30 |
| 0.8 | 0.2 | 0.49 | 2.00 | 3.34 |
| 0.9 | 0.16 | 0.53 | 3.00 | 3.38 |
| 0.9 | 0.13 | 0.57 | 4.00 | 3.42 |
| 1 | 0.12 | 0.60 | 5.00 | 3.46 |
| 1 | 0.1 | 0.60 | 6.00 | 3.50 |
| 1 | 0.1 | 0.70 | 7.00 | 4.00 |
| 1 | 0.1 | 1.00 | 10.00 | 6.60 |

TABLE 5

(Combinations of Thickness of Skin member)

| Thickness T of skin member mm | Degree of distortion δ mm | Radius of curvature R mm | X — | Isostatic Strength MPa |
|---|---|---|---|---|
| 0.3 | 0.1 | 0.20 | 0.60 | 0.7 |
| 0.4 | 0.1 | 0.20 | 0.80 | 0.9 |
| 0.5 | 0.1 | 0.20 | 1.00 | 1.1 |
| 0.6 | 0.1 | 0.20 | 1.20 | 1.3 |
| 0.7 | 0.1 | 0.20 | 1.40 | 1.5 |
| 0.8 | 0.1 | 0.20 | 1.60 | 1.7 |
| 0.9 | 0.1 | 0.20 | 1.80 | 1.9 |

TABLE 6

(Variations in Degree of Distortion)

| Thickness T of skin member mm | Degree of distortion δ mm | Radius of curvature R mm | X — | Isostatic Strength MPa |
|---|---|---|---|---|
| 1 | 1.5 | 0.20 | 0.13 | 0.7 |
| 1 | 1.2 | 0.20 | 0.17 | 0.8 |
| 1 | 0.8 | 0.20 | 0.25 | 1 |
| 1 | 0.4 | 0.20 | 0.50 | 1.2 |
| 1 | 0.1 | 0.20 | 2.00 | 1.5 |

TABLE 7

(Variations in Radius of curvature R)

| Thickness T of skin member mm | Degree of distortion δ mm | Radius of curvature R mm | X — | Isostatic Strength MPa |
|---|---|---|---|---|
| 0.6 | 0.5 | 0.02 | 0.02 | 0.5 |
| 0.6 | 0.5 | 0.10 | 0.12 | 0.8 |
| 0.6 | 0.5 | 0.20 | 0.24 | 1 |
| 0.6 | 0.5 | 0.30 | 0.36 | 1.2 |
| 0.6 | 0.5 | 0.60 | 0.72 | 1.5 |
| 0.6 | 0.5 | 1.00 | 1.20 | 1.8 |

TABLE 8

(Variations of Combinations)

| Thickness T of skin member mm | Degree of distortion δ mm | Radius of curvature R mm | X — | Isostatic Strength MPa |
|---|---|---|---|---|
| 0.3 | 1.5 | 0.02 | 0.004 | 0.7 |
| 0.3 | 1.5 | 0.13 | 0.03 | 0.8 |
| 0.3 | 1.5 | 0.25 | 0.05 | 1 |
| 0.6 | 1 | 0.20 | 0.12 | 1.1 |
| 0.6 | 0.5 | 0.20 | 0.24 | 1.2 |
| 0.6 | 0.5 | 0.30 | 0.36 | 1.4 |
| 0.6 | 0.1 | 0.20 | 1.20 | 2 |

Figure 14:
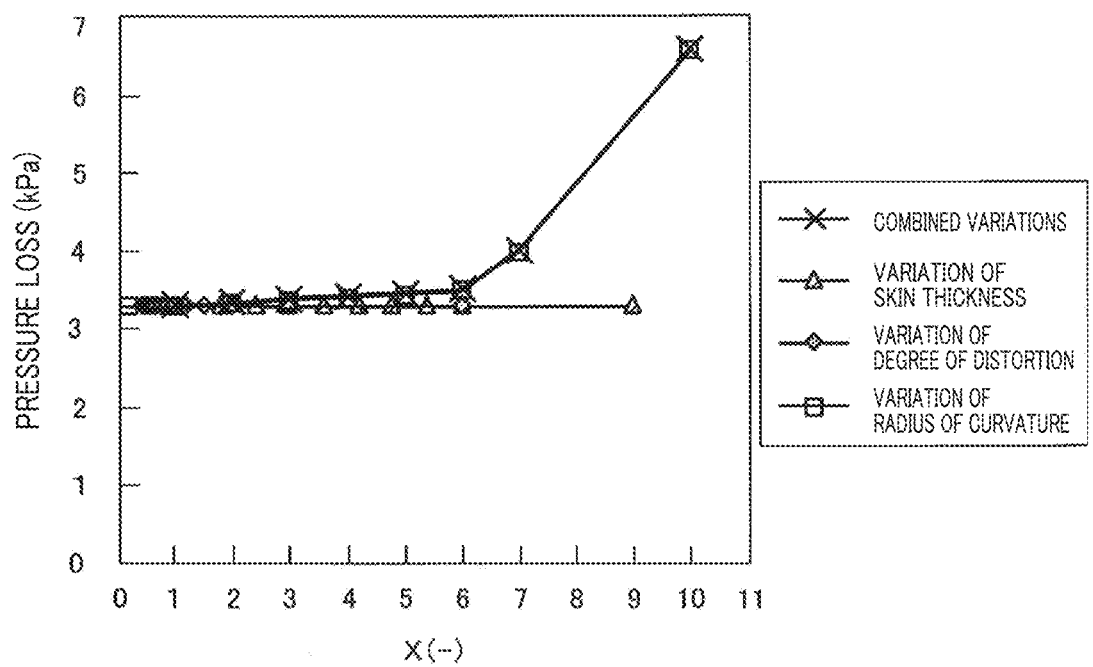
FIG. 14 is a graph showing the relationship between the structural variable X and the pressure loss in Experimental Example 1.

As shown by Tables 1 to 4 and FIG. 14, the value of the pressure loss does not change even if the thickness T of the skin member 12 or the degree of distortion δ is changed independently. By paying attention to the structural variable X expressed by Equation 1, it is possible to aim at improving the canning strength while maintaining a low amount of pressure loss. Furthermore as shown by FIG. 14, if the radius of curvature R is changed, the pressure loss increases when the radius of curvature exceeds a certain value. From considerations of this increase in pressure loss, the value of the structural variable X is made 6 or less.

Figure 15:
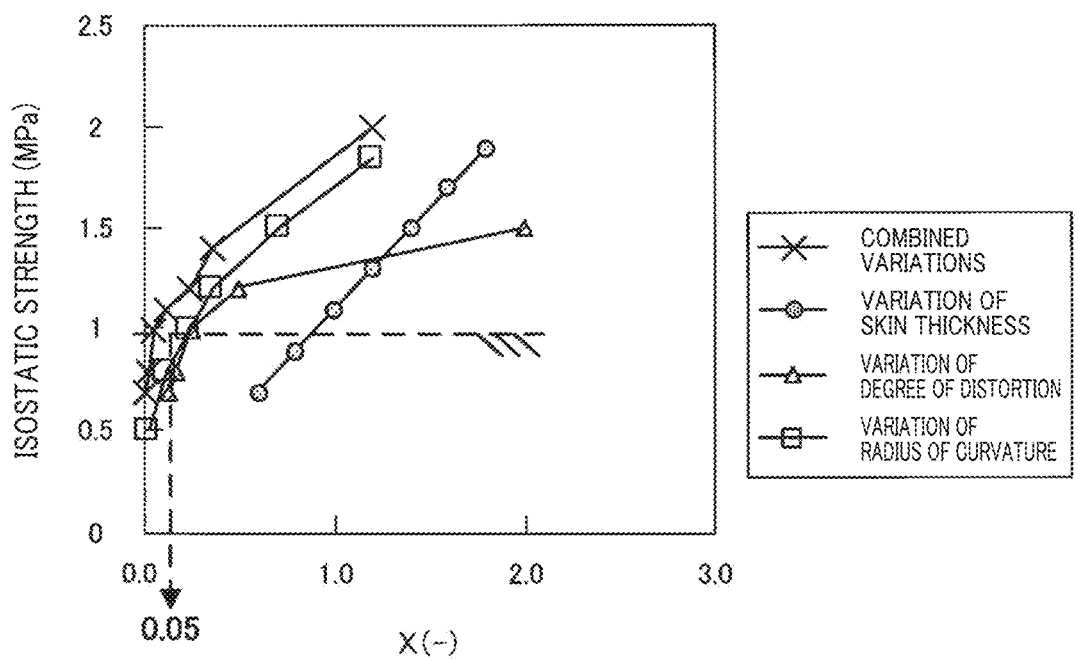
FIG. 15 is a graph showing the relationship between the structural variable X and the isostatic strength in Experimental Example 1.

As can be understood from Tables 5 to 8 and FIG. 15, even if the thickness T of the skin member 12, the degree of distortion δ, or the radius of curvature R are changed independently, the isostatic strength is affected. Changing the value of each of these parameters in a direction that produces an effect on the isostatic strength improves the isostatic strength. Combining such changes of the respective parameter values has the effect of improving the isostatic strength, even in a range where the value of the structural variable X is small. The value of the structural variable X is made at least 0.05, from considerations of ensuring sufficient strength (for example, canning strength) to prevent cracking when the filter is installed in the exhaust passage of a gasoline engine.

By adjusting the structural variable X to a value in the range 0.05~6 in this way, sufficient filter strength can be obtained while maintaining a low amount of pressure loss for the exhaust gas purification filter 1.

Experimental Example 2

Figure 16:
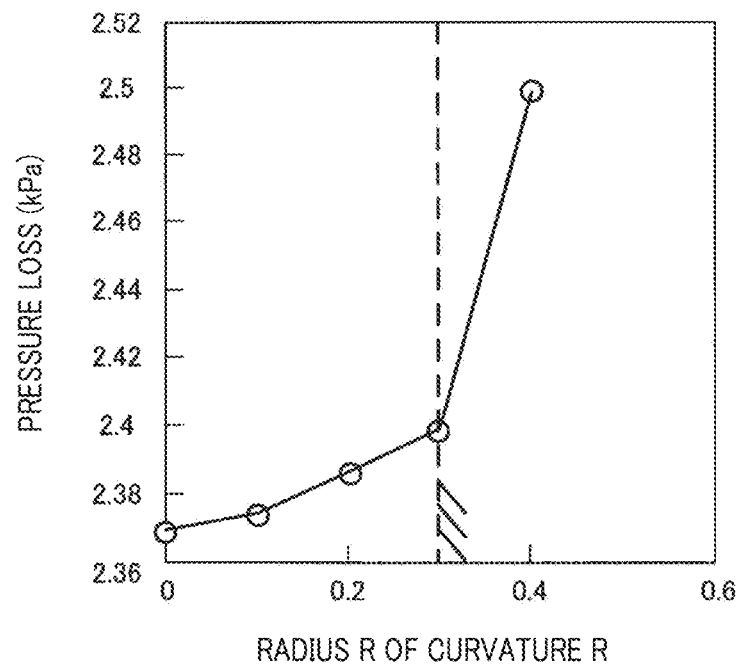
FIG. 16 is a graph showing the relationship between the radius of curvature R and the pressure loss in Experimental Example 2.

In this example a plurality of exhaust gas purification filters 1 were manufactured, having respectively different values of the radius of curvature R of each of the parts of the outer periphery 213 of each of the cells 21 defined by a corresponding one of the crossing portions 225. Each of these exhaust gas purification filters 1 had a length L in the axial direction Y of 100 mm, a diameter of D of 118 mm, a partition wall thickness of 0.2 mm, and cells 21 having a quadrangular cross-sectional shape, a cell pitch of 1.47 mm, and a porosity of 63%. The values of radius of curvature R and pressure loss of each of the exhaust gas purification filters 1 were measured. The relationship between the radius of curvature R and the pressure loss is shown in FIG. 16.

Assuming that a certain exhaust gas purification filter 1 has cell specifications whereby the hydraulic diameter d of each of the cells 21 of the filter is 1.27 mm, the upper limit value of the radius of curvature R is 0.635 mm. On the other hand, according to the actual measurement results shown in FIG. 16, as the radius of curvature R changes from 0 to 0.4 mm, the pressure loss of the filter increases by 7.1%, and the value of the radius of curvature R has a singular point at which the pressure loss greatly increases. Hence, from considerations of setting the value of the radius of curvature R at the singular point or less, the upper limit of the radius of curvature R is set as 0.3 mm That is, if R ☐ 0.3, the pressure loss can be kept low. Since the thickness of the partition wall 22 and the cell pitch have design specification ranges, an upper limit is set to the radius of curvature R, from the ratio R/(0.5×d) of the radius of curvature R and ½ of the hydraulic diameter d (that is, the radius of the circle of the hydraulic diameter), to maintain a low degree of pressure loss. That is, $$R/(0.5 \times d) = 0.3/0.635 = 0.47 \approx 0.5$$

Hence if Equation 2 is satisfied, whereby R ☐ 0.5×d/2, a lower degree of pressure loss can be achieved.

Experimental Example 3

In this example a plurality of exhaust gas purification filters 1 were manufactured, having respectively different values of material strength and porosity in the cell assembly 2 and the skin member 12. Each exhaust gas purification filter 1 has a length L in the axial direction Y of 100 mm, a diameter of Φ of 118 mm, a partition wall thickness of 0.2 mm, a quadrangular cross-sectional shape for the cells 21, and a cell pitch of 1.47 mm. The material strength, isostatic strength, and porosity of each exhaust gas purification filter 1 were measured. The relationship between the material strength and the isostatic strength is shown in FIG. 17, and the relationship between the porosity and the material strength is shown in FIG. 18.

Figure 17:
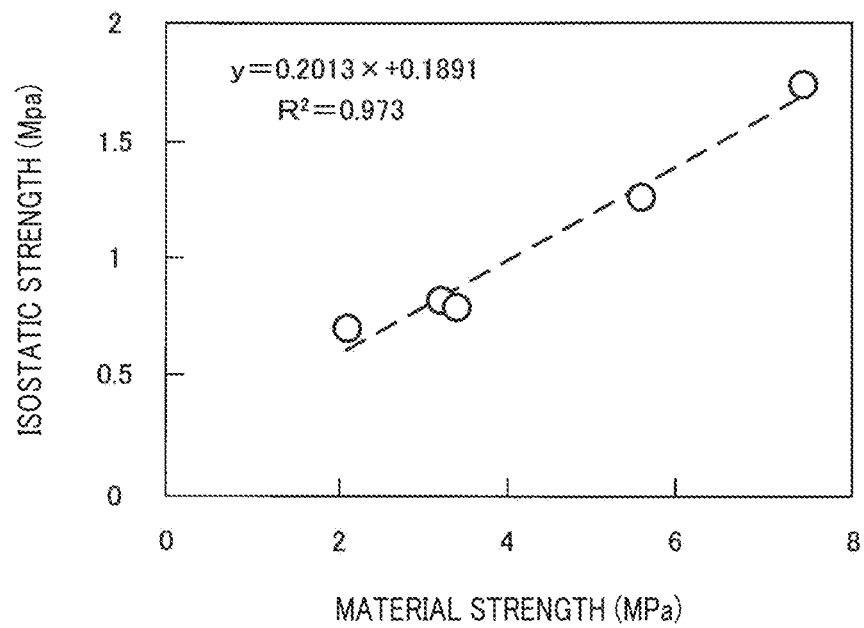
FIG. 17 is a graph showing the relationship between material strength and isostatic strength in Experimental Example 3.
Figure 18:
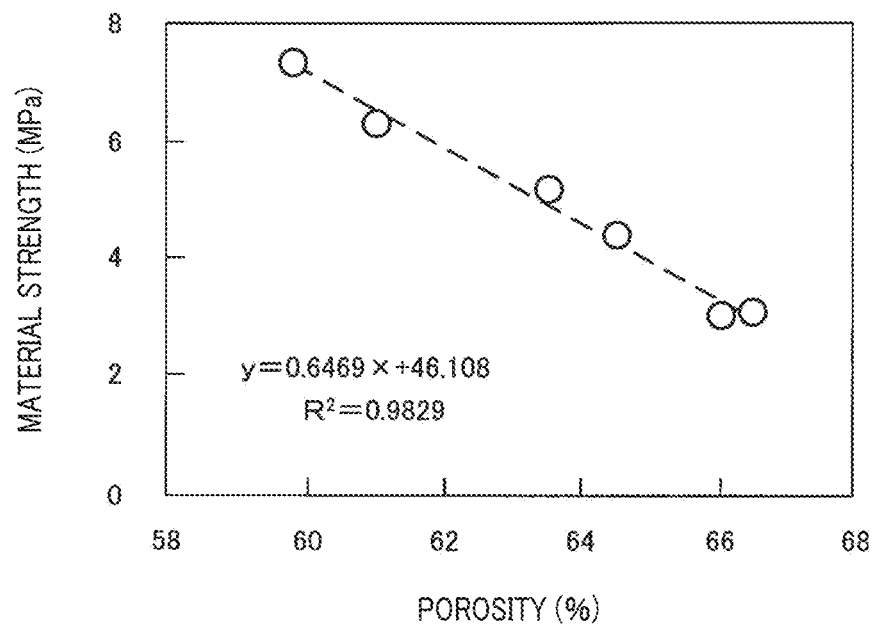
FIG. 18 is a graph showing the relationship between porosity and material strength in Experimental Example 3.

FIG. 17 shows the relationship between the material strength and the isostatic strength of the exhaust gas purification filter 1. As shown in FIG. 17, when the data are linearly approximated, it can be seen that as the material strength increases, the isostatic strength also tends to increase. FIG. 18 shows the relationship between the porosity and the material strength. It can be seen from FIG. 18 that linear approximation of the data shows the material strength to have a negative proportional relationship to the porosity. That is, as the porosity increases, the material strength tends to decrease.

The stress during canning is concentrated on the outermost circumference of the exhaust gas purification filter 1, that is, the skin member 12. Hence from considerations of preventing cracking during canning, it is advantageous for the material strength of the skin member 12 to be high. On the other hand, if the porosity is high the material strength is low. That is, if the material strength of the cell assembly 2 is low, this signifies that the partition wall 22 have many gas passage holes. Since the exhaust gas readily flows to the central part of the exhaust gas purification filter 1 in a direction orthogonal to the axial direction Y, while it is difficult for the gas to flow to the skin member 12 side (that is, the outer peripheral side), the exhaust gas flow in the central part of the exhaust gas purification filter 1 is dominant in determining the flow rate through the filter, by comparison with the outer peripheral side. Thus, even if the material strength of the skin member 12 is increased, the influence on the flow rate of the exhaust gas through the filter is small, and increase in the pressure loss can be avoided.

Hence it is preferable for the material strength $S_B$ of the skin member 12 to be higher than the material strength $S_A$ of the cell assembly 2, from considerations of further improving the filter strength while suppressing pressure loss and preventing cracking during canning, for example. That is, preferably $S_A < S_B$. From the same aspect, it is preferable that the porosity $P_A$ of the cell assembly 2 is greater than the porosity $P_B$ of the skin member 12. That is, it is preferable that $P_A > P_B$.

The present disclosure is not limited to the above embodiments and experimental examples, and can be applied to various embodiments without departing from the gist thereof. For example, the exhaust gas purification filter is suitable for purifying the exhaust gas from a gasoline engine, however it can also be used for purifying the exhaust gas from a diesel engine. The exhaust gas purification filter is suitable for a filter having a square cell shape in which the cell openings on both end surfaces are alternately closed by seal members. However the exhaust gas purification filter is not limited to the square cell shape as long as the cell openings are alternately closed.

Although this disclosure has been described in accordance with an embodiment, it is understood that the disclosure is not limited to that embodiment or structure. The scope of the present disclosure also covers various modifications, including modifications that are within a range of equivalents. In addition, various combinations and forms, as well as combinations and forms that contain only one element, more, or less, also come within the scope of the present disclosure.

What is claimed is:

1. An exhaust gas purification filter, having external dimensions, disposed in an exhaust passage of a gasoline engine, comprising:
   a cell assembly having an outer surface and including:
   a plurality of cells each disposed to extend in an axial direction of the filter, each of the cells having opposing first and second ends in the axial direction, and
   a partition wall configured to have a porous structure and define the plurality of cells partitioned from each other in a grid pattern;
   a plurality of seal members disposed alternately in the first and second ends of the respective cells, each of the seal members being configured to seal a corresponding one of the first end and the second end of a corresponding one of the cells of the cell assembly; and a skin member configured to have a tubular shape and be mounted on the outer surface of the cell assembly, wherein:

the partition wall has a porosity of 50% to 70%, the skin member has a thickness T of 0.3 mm to 1.0 mm, the partition wall includes a plurality of crossing portions, each of the cells has at least one part of an outer periphery defined by a corresponding one of the crossing portions, the at least one part of the outer periphery of each of the cells is rounded to have a value of radius of curvature R being 0.02 mm to 0.6 mm, a degree of distortion δ, which is a degree of change in the external dimensions of the exhaust gas purification filter in the axial direction, is greater than 0 and is 1.5 mm or less, and a value of a structural variable X, expressed by Equation 1 below, is 0.05 to 6, $$X = T \times R / \delta \qquad \text{Equation 1.}$$

2. The exhaust gas purification filter according to claim 1, wherein:

a cross-sectional shape of each of the cells, on a plane orthogonal to the axial direction, is quadrangular, and the radius of curvature R and a hydraulic diameter d of each of the cells satisfy the relationship expressed by Equation 2 below, $$R \leq 0.5 \times d/2 \qquad \text{Equation 2.}$$

3. The exhaust gas purification filter according to claim 1, wherein: a material strength $S_A$ of the cell assembly and a material strength $S_B$ of the skin member satisfy the relationship expressed by Equation 3 below, $$S_A < S_B \qquad \text{Equation 3.}$$

4. The exhaust gas purification filter according to claim 1, wherein: a porosity $P_A$ of the cell assembly and a porosity $P_B$ of the skin member satisfy the relationship of Equation 4 below, $$P_A > P_B \qquad \text{Equation 4.}$$

5. The exhaust gas purification filter according to claim 1, wherein the skin member is formed integrally on the outer surface of the cell assembly.

6. The exhaust gas purification filter according to claim 1, wherein the skin member is integrally and directly connected to the partition wall.

* * * * *